No. 719,856. PATENTED FEB. 3, 1903.
V. T. PAYNE.
CLUTCH.
APPLICATION FILED DEC. 17, 1902.
NO MODEL.

Witnesses
Harry L. Ames.
Edwin G. McKee.

Inventor
Victor Tom Payne.
By Rexford M. Smith.
Attorney.

UNITED STATES PATENT OFFICE.

VICTOR TOM PAYNE, OF BATTLECREEK, MICHIGAN, ASSIGNOR TO NICHOLS AND SHEPARD COMPANY, OF BATTLECREEK, MICHIGAN.

CLUTCH.

SPECIFICATION forming part of Letters Patent No. 719,856, dated February 3, 1903.

Application filed December 17, 1902. Serial No. 135,583. (No model.)

*To all whom it may concern:*

Be it known that I, VICTOR TOM PAYNE, a citizen of the United States, residing at Battlecreek, in the county of Calhoun and State of Michigan, have invented a certain new and useful Clutch, of which the following is a specification, reference being had therein to the accompanying drawings.

This invention relates to clutches especially designed for use in connection with rotary elements, such as wheels or pulleys, for the purpose of transmitting the motion of one rotary member to the other.

In various kinds of machinery such as require a certain speed before they become effectively operative it is necessary to disconnect the driven mechanism from the driver, allowing the necessary speed to be obtained before throwing the machine into operation. The clutch mechanism hereinafter described operates automatically upon the attainment of a certain predetermined speed of the driving member to automatically take up the driven member and transmit the motion of the driver to the driven member, the latter being then operated at the same rate of speed as the driver.

A further object of the present invention is to produce a positive transmittal of motion from the driving to the driven member, thereby doing away with the unreliable frictional action which has heretofore been almost universally used and which is open to the fatal objection that such frictional clutch is easily and quickly affected by any dust, dirt, or grease accumulating around the operative parts of the clutch. In the construction hereinafter described the clutch members are covered or protected and kept in perfect working condition, so that they always operate uniformly and positively.

With the above and other objects in view the invention consists in the novel construction, combination, and arrangement of parts hereinafter fully described, illustrated, and claimed.

Figure 1:
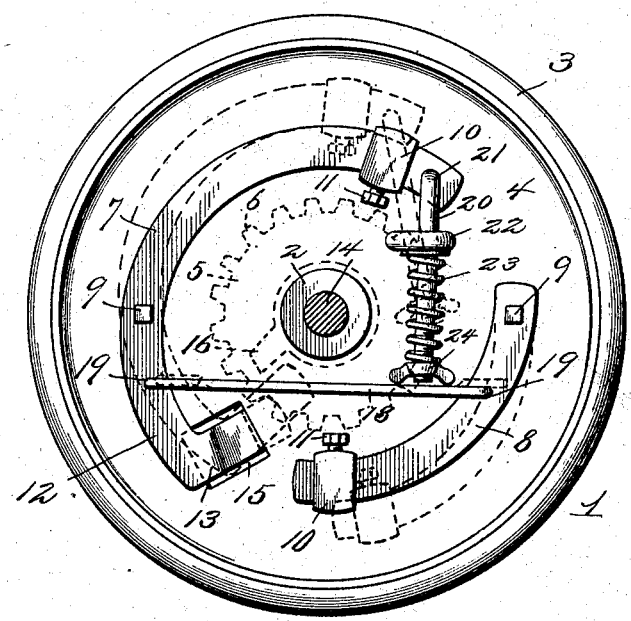
Figure 2:
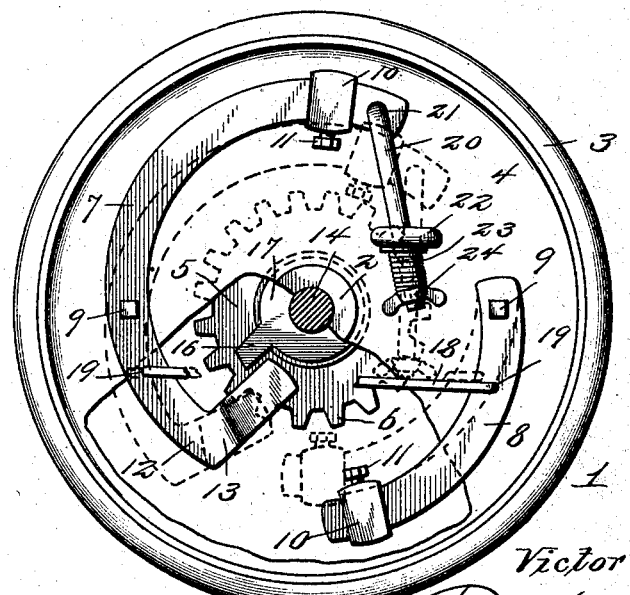

In the accompanying drawings, Figure 1 is a side elevation of a clutch constructed in accordance with the present invention, and Fig. 2 is a similar view with certain parts broken away to better illustrate the construction.

Like reference-numerals designate all corresponding parts in the figures of the drawings.

Referring to the drawings, 1 designates a wheel, which may be termed the "rotary driving member," which is shown in the form of a belt or band wheel consisting of a hub 2, a flat belt-receiving rim 3, and a web 4, connecting the hub and rim. Such web may, however, consist of a spider or spokes. 5 designates another wheel, which may be termed the "rotary driven member," the same being shown in the form of a sprocket-wheel provided with teeth 6. This wheel when in operation is adapted to transmit its power by means of sprocket-chains or equivalent devices to that part of the machine which is desired to be driven when the rotary driving member attains a particular speed.

The rotary driving member 1 is continuously driven from any suitable motor, and the object of the invention is to provide means whereby upon the attainment of a certain predetermined speed on the part of the rotary member 1 the rotary driven member 5 will be taken up and driven at the same speed as the rotary driving member.

In carrying out the invention resort is had to a plurality of centrifugal arms 7 and 8, the arm 7 being shown longer than the arm 8. Each arm is pivotally mounted at 9 and provided on its longer arm and toward its outer free end with an adjustable weight 10, which may be moved inward or outward on the arm and held at any desired adjustment by means of a binding-screw 11 or similar device. The longer arm 7 is projected beyond its pivot 9 to form a heel extension 12, which terminates in an inwardly-projecting tongue 13, extending approximately toward the shaft or axle 14, upon which the rotary driving and driven members are mounted. The tongue 13 is deflected or bent and passed through an opening 15 in the web 4 of the rotary member 1, so as to bring the extremity of the tongue on the opposite side of the web from the main body of the centrifugal arm 7, of which it forms a part. The centrifugal arms are located or mounted upon the outer or exposed side of the rotary member, where they are convenient of access. This brings the extremity of the tongue upon the opposite or inner side of the web 4, where it will be protected from dirt, dust, and other impurities. By reference to the drawings it will be seen that the specified location of the tongue 13 adapts the extremity thereof to be moved into and out of the path of a lug 16, extending radially outward from the hub 17 of the rotary driven member 5, thus providing for a positive interlocking engagement between the tongue and said lug when the tongue is moved inward to the position shown in full lines in Fig. 2 and also in dotted lines in Fig. 1. In order to cause the centrifugal arms to move simultaneously and equally, they are coupled together by an equalizing connection 18, shown in the form of a rod, the ends of which are pivotally connected with the centrifugal arms by bending the ends of the rod inward and inserting them in openings 19 in the arms 7 and 8. It will be observed that one end of the rod 18 connects with the arm 8, between the pivot 9 and the weighted free end thereof, while the opposite end of the rod connects with the arm 7 on the opposite side of the pivot 9 or between said pivot and the tongue 13. The outward movement of the centrifugal arms is governed by means of a tension device connected with the free end of one of the arms and consisting of a short rod 20, pivotally connected at 21 to the arm and passing through a guide-eye 22, projecting from the web 4, the said rod being encircled by a coiled spring 23, interposed between the eye 22 and an adjustable thumb-nut 24, threaded upon the extremity of said rod, as shown. As the rotary driving member 1 revolves rapidly and increases its speed the arms 7 and 8 move outward by centrifugal action, gradually overcoming the tension of the spring 23. By adjusting the thumb-nut 24 the resistance of the outward movement of the arms 7 and 8 may be regulated to a nicety. As the arms move outward the tongue 13 is carried inward, and upon the attainment of a certain speed the extremity of the tongue is moved into the path of the lug 16 on the hub of the driven member. Thereupon a positive interlocking engagement is effected between the tongue and lug, causing the motion of the rotary driving member to be imparted or transmitted to the rotary driven member. This engagement, however, does not take place until the driving member has attained a certain predetermined speed, the desired speed being regulated by means of the adjustable tension device connected with one of the centrifugal arms, as hereinabove particularly described.

It will be seen that the clutch hereinabove described operates with a positive action, and at the same time the interlocking parts of the device are arranged back of or behind the web of the driving-pulley or rotary member, where they are protected from dust and dirt, which has been found fatal to the continuous and practical operation of the frictional clutches heretofore used in machines of the class referred to. The clutch is effective only when a certain speed is reached by the rotary driving member. As soon as such speed is reached the rotary driven member is taken up and operated with a speed equal to that of the driving member. As soon as the speed of the driving member drops below a certain point the rotary driven member becomes automatically disconnected and allows the rotary driving member to operate independently thereof.

Having thus described the invention, what I claim as new, and desire to secure by Letters Patent, is—

1. A clutch comprising a rotary driving member, a rotary driven member, a lug or shoulder on the driven member, centrifugal arms on the driving member, a tongue on one of said arms movable into and out of the path of said lug, and an equalizing connection between the centrifugal arms.

2. A clutch comprising a rotary driving member, a rotary driven member, a lug or shoulder on the driven member, centrifugal arms on the driving member, an equalizing connection coupling the centrifugal arms together, a tongue on one of said arms movable into and out of the path of the lug or shoulder, and a tension device connected with one of said arms.

3. A clutch comprising a rotary driving member, a rotary driven member, a lug or shoulder on the driven member, centrifugal arms on the driving member, an equalizing connection coupling said arms together, a tongue on one of said arms movable into and out of the path of said lug or shoulder, and adjustable weights on the centrifugal arms.

4. A clutch comprising a rotary driving member, a rotary driven member, a lug or shoulder on the driven member, centrifugal arms on the driving member, one of said arms being provided with a heel extension and an inwardly-projecting tongue movable into and out of the path of said lug or shoulder, and an equalizing connection interposed between the main body of one of the centrifugal arms and the heel end extension of the opposite arm, substantially as described.

5. A clutch comprising a rotary driving member, a rotary driven member, a lug or shoulder on the driven member, centrifugal arms on the driving member, one of said arms being provided with a heel extension terminating in an inwardly-projecting tongue, said tongue working through an opening in the body or web of the driving member and projecting on the opposite side thereof so as to move into and out of the path of said lug or shoulder, an equalizing connection between the centrifugal arms, and a tension device connected with one of said arms.

In testimony whereof I affix my signature in presence of two witnesses.

VICTOR TOM PAYNE.

Witnesses:
BEN BURGESS,
ORIN GESAMAN.